(12) United States Patent
Kosacek et al.

(10) Patent No.: US 7,751,206 B2
(45) Date of Patent: Jul. 6, 2010

(54) CABLE MANAGEMENT SYSTEM

(75) Inventors: Michael Kosacek, Round Rock, TX (US); Ravi Kumar, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 688 days.

(21) Appl. No.: 11/696,246

(22) Filed: Apr. 4, 2007

(65) Prior Publication Data

US 2008/0247132 A1 Oct. 9, 2008

(51) Int. Cl.
*H02B 1/21* (2006.01)
(52) U.S. Cl. ...................... 361/826; 361/827; 174/72 A
(58) Field of Classification Search ................. 361/826, 361/827; 174/69, 70 R, 71 R, 72 R, 72 A, 174/72 TR
See application file for complete search history.

(56) References Cited

U.S. PATENT DOCUMENTS

| | | | | |
|---|---|---|---|---|
| 2,299,140 A | * | 10/1942 | Hanson | 174/72 A |
| 3,984,622 A | * | 10/1976 | Ross | 174/72 A |
| 4,375,012 A | * | 2/1983 | Cocco et al. | 174/69 |
| 4,551,185 A | * | 11/1985 | Loesch | 148/568 |
| 4,614,383 A | * | 9/1986 | Polley et al. | 312/273 |
| 4,683,349 A | * | 7/1987 | Takebe | 174/69 |
| 4,901,038 A | * | 2/1990 | Dusclaux et al. | 331/167 |
| 5,913,487 A | * | 6/1999 | Leatherman | 242/378.4 |
| 6,235,990 B1 | * | 5/2001 | Morris et al. | 174/69 |
| 6,349,807 B1 | * | 2/2002 | Northup et al. | 191/12 R |
| 6,483,033 B1 | * | 11/2002 | Simoes et al. | 174/72 A |
| 6,600,109 B1 | | 7/2003 | Andre et al. | |
| 7,092,258 B2 | | 8/2006 | Hardt et al. | |
| 7,102,887 B2 | | 9/2006 | Blackwell | |
| 7,147,062 B2 | | 12/2006 | Kolacz et al. | |
| 7,188,415 B2 | * | 3/2007 | Robinson et al. | 29/868 |
| 7,359,218 B2 | * | 4/2008 | McGrew | 361/826 |
| 7,480,154 B2 | * | 1/2009 | Lawrence et al. | 361/826 |
| 2005/0203756 A1 | | 9/2005 | Pirich, Jr. et al. | |

* cited by examiner

*Primary Examiner*—Dameon E Levi
(74) *Attorney, Agent, or Firm*—Haynes and Boone, LLP

(57) ABSTRACT

A cable management system includes a cable base comprising a first end, a second end, and a resilient member that is operable to allow a rest distance between the first end and the second end to be changed. A plurality of cables are partially housed in the cable base, wherein each cable includes a first section that extends from the first end of the cable base and a second section that extends from the second end of the cable base.

13 Claims, 14 Drawing Sheets

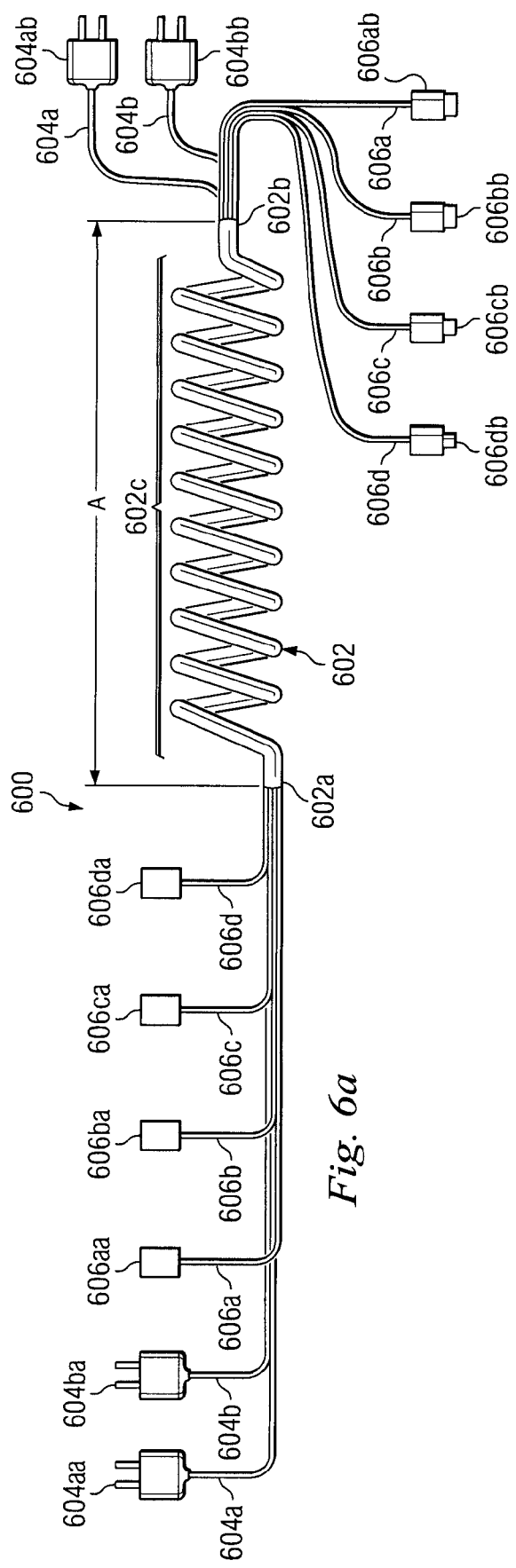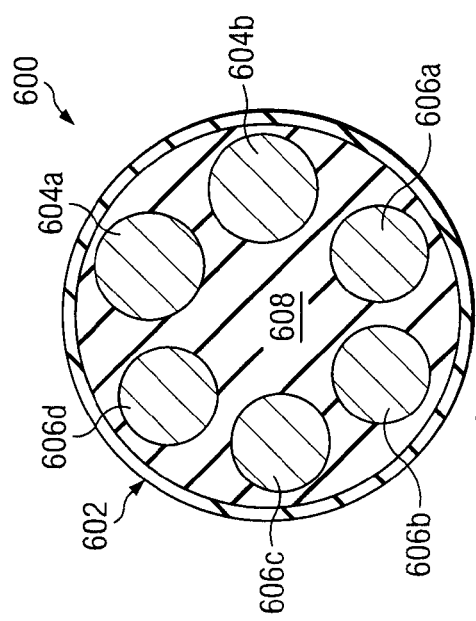
Fig. 6a
Fig. 6b

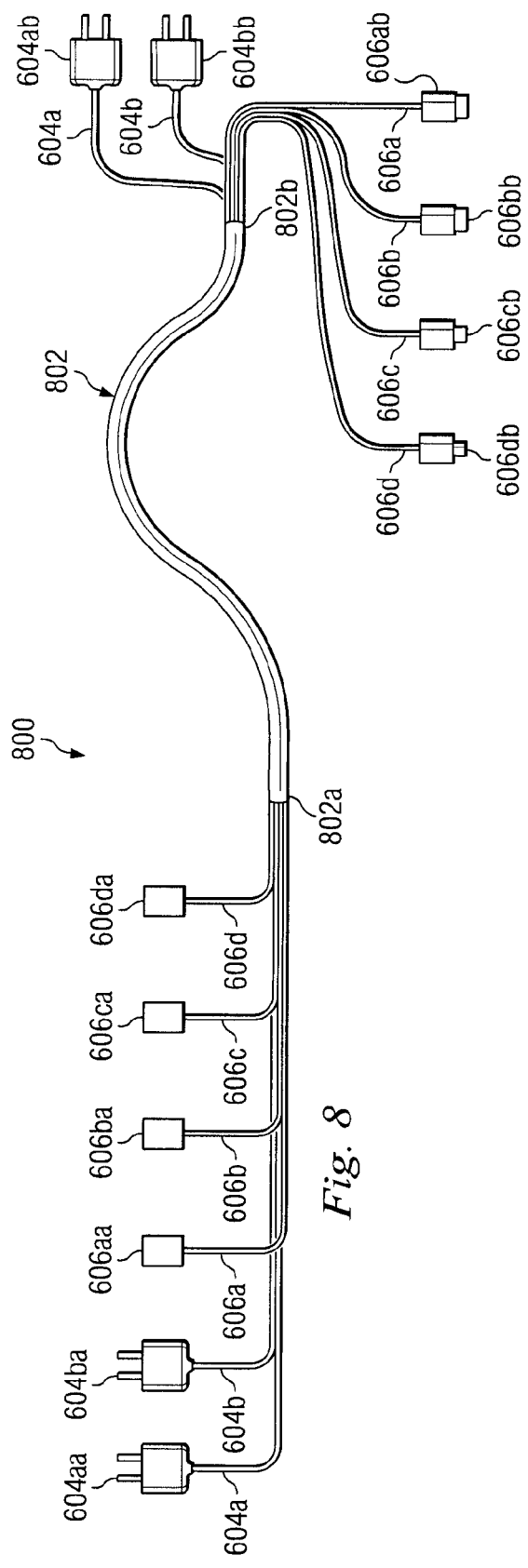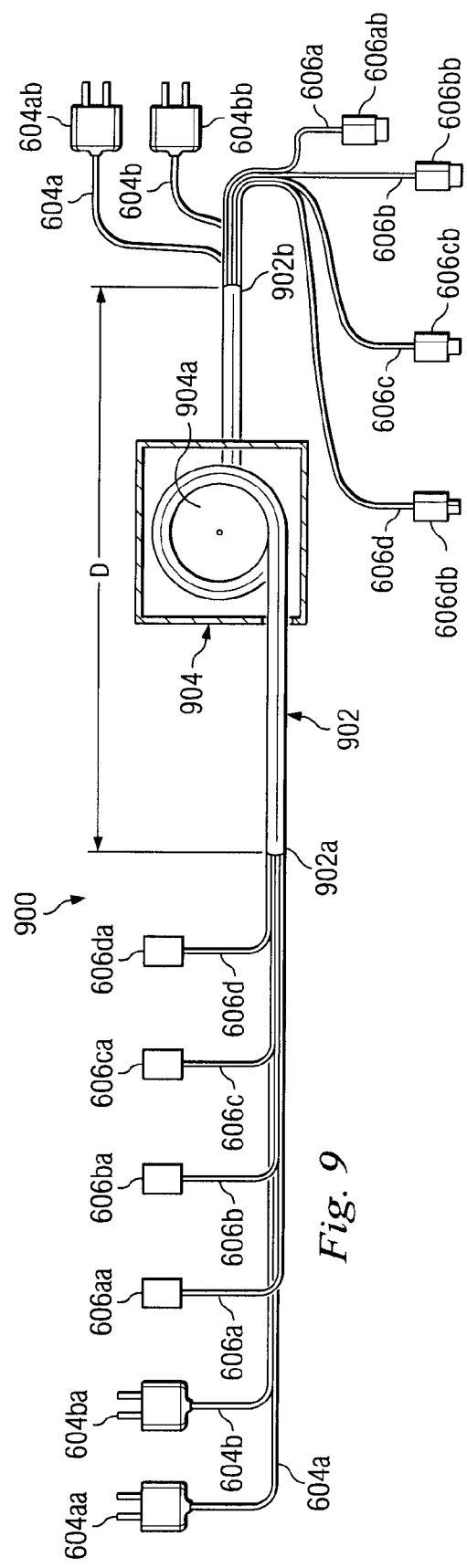
Fig. 8
Fig. 9

CABLE MANAGEMENT SYSTEM

BACKGROUND

The present disclosure relates generally to information handling systems, and more particularly to a cable management for an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs include a plurality of IHSs that are stored in racks and coupled together in order, for example, to provide a higher degree of computing power. Each IHS stored in the rack may require a plurality of cables that couple to, for example, that IHS, other IHSs stored in the rack, other IHSs stored outside the rack, and/or cable connections on the rack. As number of IHSs in the rack grows, the management of the cables raises a number of issues.

Typically, a customer who orders a plurality of IHSs for a rack-type system described above will receive a plurality of individual cables that may or may not be needed for each system. The customer will use some of those cables on each IHS, and the leftover cables with be discarded or stored, which increases costs. Installation of the cabling typically involves connecting each cable to the IHS and to the corresponding connection that provides functionality to that IHS. As each IHS requires a plurality of cables, this results in a high number of individual cables running through the rack. When all of the IHSs in the rack have been cabled, these individual cables are typically tied together and/or to the rack in groupings that are appropriate with the positioning of the cables. For large data centers, the process of cabling the IHSs can take many months, and the tying together of cables results in the need to disconnect the cables from an IHS when the need arises to slide that IHS partially out of the rack to, for example, add components to that IHS or troubleshoot problems with that IHS. Customers typically pay premiums to have such cabling done, which increases costs. Furthermore, cabling in this manner results in cabling that is not consistent across customers, which makes troubleshooting cabling problems difficult, time consuming, and expensive.

One solution to this cable management problem is to provide a cable management arm, which is a metal jointed arm that defines a passageway and pivotally couples to the rack. Cables that are coupled to an IHS are positioned in the passageway on the cable management arm such that when the IHS is slid partially out of the rack, the cable management arm pivots on its own coupling and its coupling to the rack and extends into the rack to allow the cables to remain connected to the IHS as that IHS is moved through the rack. However, these cable management arms tend to be large and bulky and can obstruct access to and take up space in the rear of the rack. Furthermore, a cable management arm may be needed for each IHS in the rack, and they must each be individually installed on the rack, increasing shipping costs and installation times.

Accordingly, it would be desirable to provide improved cable management.

SUMMARY

According to one embodiment, a cable management system includes a cable base including a first end, a second end, and a resilient member that is operable to allow a rest distance between the first end and the second end to be changed, and a plurality of cables partially housed in the cable base, wherein each cable includes a first section that extends from the first end of the cable base and a second section that extends from the second end of the cable base.

BRIEF DESCRIPTION OF THE DRAWINGS

FIG. 6a is a side view illustrating an embodiment of a cable management system used with the rack of FIG. 2, the server IHS of FIG. 3, the IHS of FIG. 4, and the IHS of FIG. 5.

FIG. 6b is a cross sectional view illustrating an embodiment of the cable management system of FIG. 6a.

FIG. 7e is a perspective view illustrating an embodiment of the server IHS of FIG. 3 moved partially out of the rack of FIG. 2 while coupled to the IHS of FIG. 4 and the IHS of FIG. 5 with the cable management system of FIG. 6a.

FIG. 7f is a perspective view illustrating an embodiment of a plurality of the server IHSs of FIG. 3 located in the rack of FIG. 2 and coupled to the IHS of FIG. 4 and the IHS of FIG. 5 with a plurality of the cable management systems of FIG. 6a.

FIG. 7h is a perspective view illustrating an alternative embodiment of the server IHS of FIG. 3 moved partially out of the rack of FIG. 2 while coupled to the IHS of FIG. 4 and the IHS of FIG. 5 with the cable management system of FIG. 6a.

FIG. 8 is a side view illustrating an alternative embodiment of a cable management system.

FIG. 9 is a side view illustrating an alternative embodiment of a cable management system.

FIG. 10b is a cross sectional view illustrating an embodiment of the cable management system of FIG. 10a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
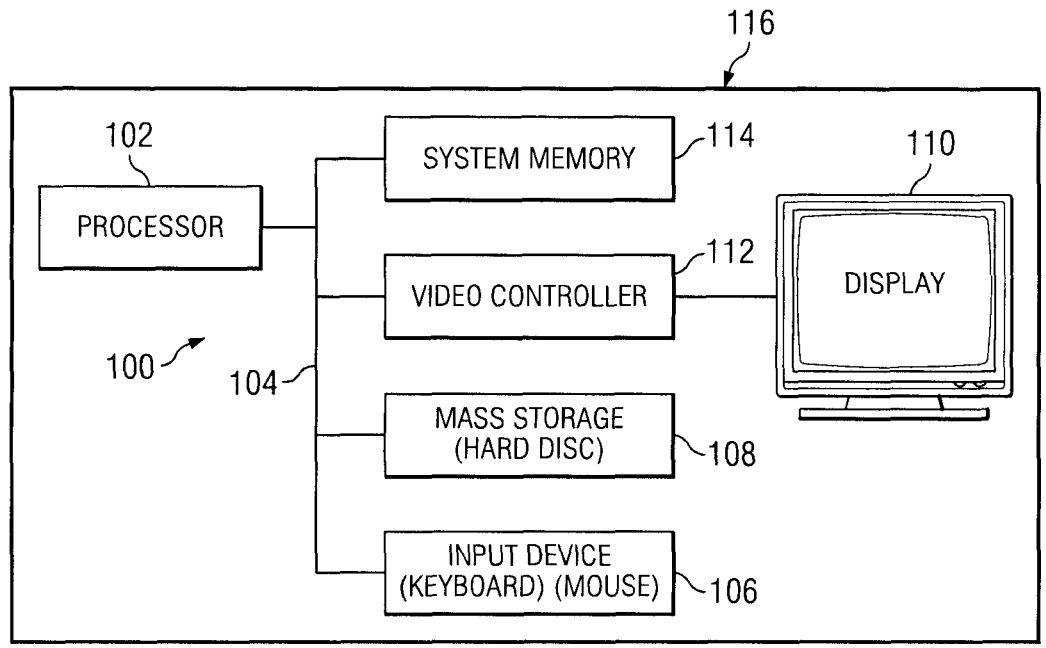
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of computer system 100. An input device 106 is coupled to processor 102 to provide input to processor 102. Examples of input devices include keyboards, touchscreens, and pointing devices such as mouses, trackballs and trackpads. Programs and data are stored on a mass storage device 108, which is coupled to processor 102. Mass storage devices include such devices as hard disks, optical disks, magneto-optical drives, floppy drives and the like. IHS 100 further includes a display 110, which is coupled to processor 102 by a video controller 112. A system memory 114 is coupled to processor 102 to provide the processor with fast storage to facilitate execution of computer programs by processor 102. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
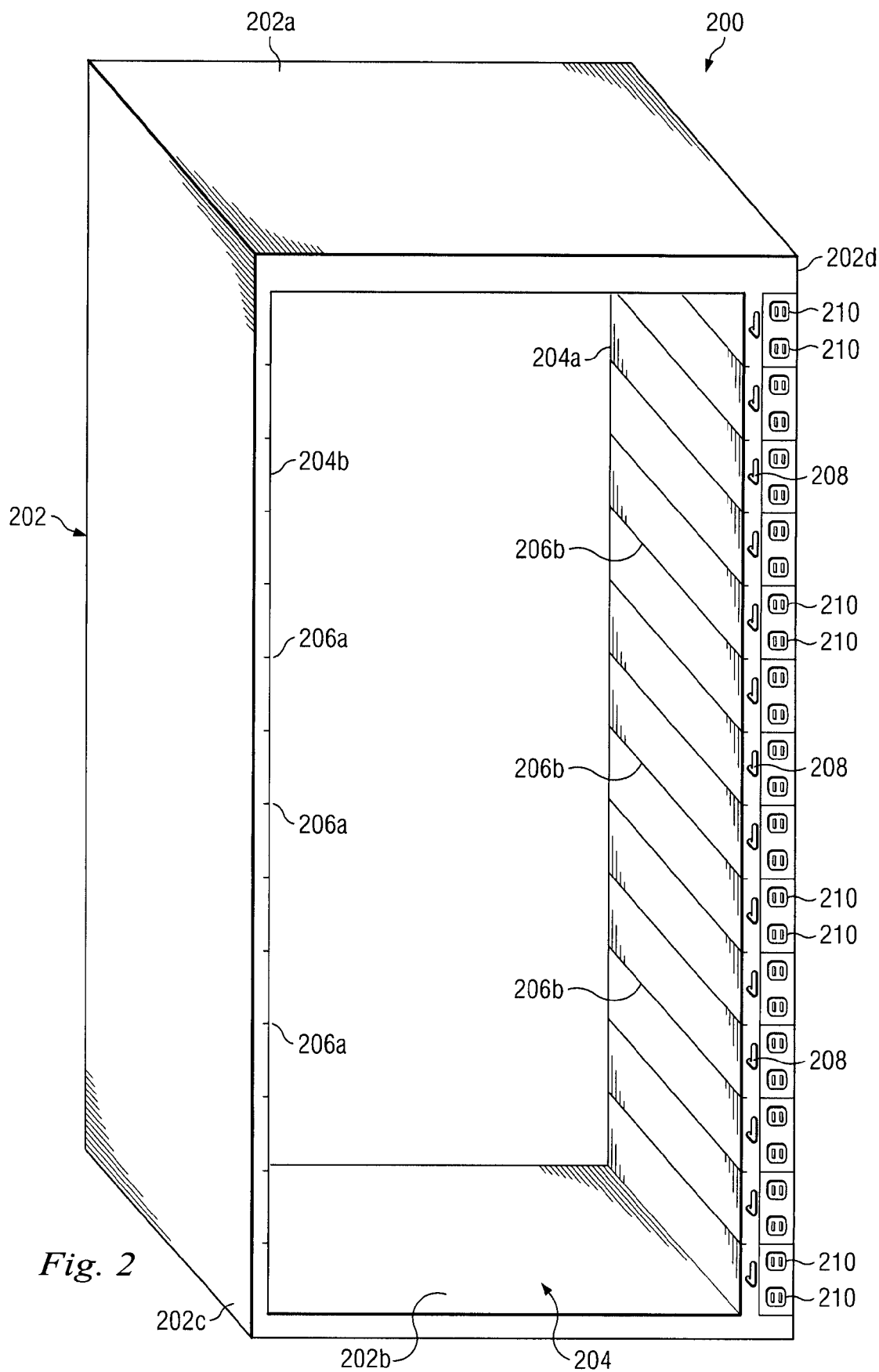
FIG. 2 is a perspective view illustrating an embodiment of a rack.

Referring now to FIG. 2, a rack 200 is illustrated. The rack 200 includes a base 202 having a top wall 202a, a bottom wall 202b located opposite the top wall 202a, and a pair of opposing sides walls 202c and 202d extending between the top wall 202a and the bottom wall 202b. The top wall 202a, the bottom wall 202b, and the side walls 202c and 202d are oriented such that they define an IHS housing 204 between them. A front housing opening 204a is defined by the top wall 202a, the bottom wall 202b, and the side walls 202c and 202d and provides access to the IHS housing 204. A rear housing opening 204b is defined by the top wall 202a, the bottom wall 202b, and the side walls 202c and 202d and provides access to the IHS housing 204. The side wall 202c includes a plurality of guide members 206a located in a substantially parallel, spaced apart orientation along its length. The side wall 202d includes a plurality of guide members 206b located in a substantially parallel, spaced apart orientation along its length. A plurality of anchor members 208 are located on the side wall 202d adjacent the rear housing opening 204b. A plurality of power connectors 210 are also located on the side wall 202d adjacent respective anchor members 208 and the rear housing opening 204b. In an embodiment, the rack 200 is a rack operable to house a plurality of IHSs such as, for example, the IHS 100, described above with reference to FIG. 1. In an embodiment, the rack 200 is a high-density rack operable to house a plurality of IHSs such as, for example, 1U IHSs, 2U IHSs, and/or a variety of other rack-housed IHSs known in the art.

Figure 3:
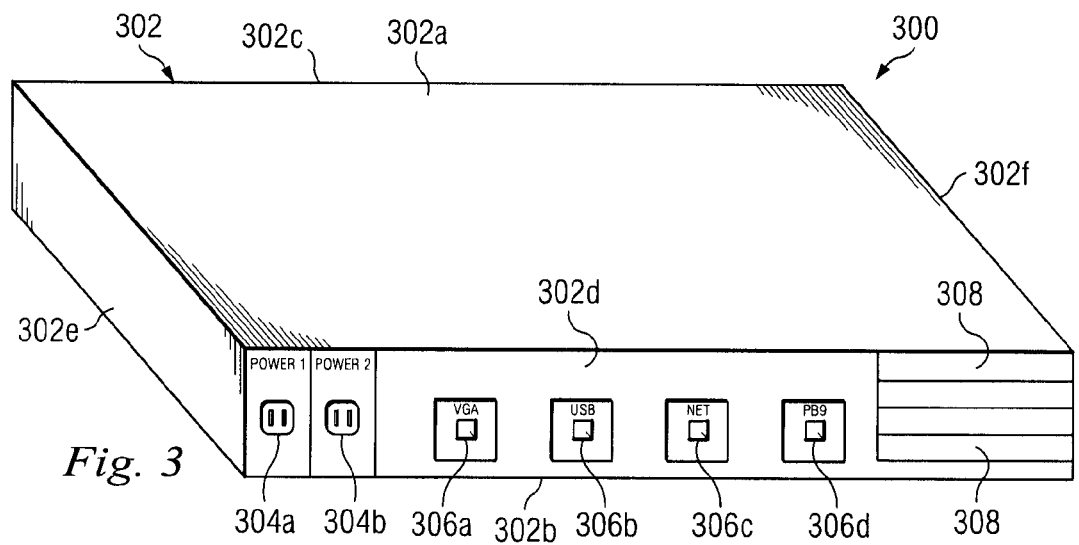
FIG. 3 is a perspective view illustrating an embodiment of a server IHS used with the rack of FIG. 2.

Referring now to FIG. 3, a server IHS 300 is illustrated. The server IHS 300 includes a base 302 having a top surface 302a, a bottom surface 302b located opposite the top surface 302a, a front surface 302c extending between the top surface 302a and the bottom surface 302b, a rear surface 302d located opposite the front surface 302c and extending between the top surface 302a and the bottom surface 302b, and a pair of opposing sides surfaces 302e and 302f extending between the top surface 302a, the bottom surface 302b, the front surface 302c, and the rear surface 302d. A first power connection 304a is located on the rear surface 302d and adjacent the side surface 302e. A second power connection 304b is located on the rear surface 302d and adjacent the first power connection 304a. A plurality of IHS connections 306a, 306b, 306c and 306d are substantially centrally located on the rear surface 302d in a spaced apart orientation from each other. In the illustrated embodiment, the IHS connection 306a is a Video Graphics Array (VGA) connection, the IHS connection 306b is a Universal Serial Bus (USB) connection, the IHS connection 306c is a network connection, the IHS connection 306d is a serial connection such as, for example, a DB9 connection. The power connectors 304a and 304b and the IHS connections 306a, 306b, 306c and 306d are shown merely as examples and a variety of additional and/or different connections known in the art are envisioned to fall within the scope of the present disclosure. A plurality of expansion slots 308 are defined by the base 302 and located on the rear surface 302d adjacent the side surface 302f. In an embodiment, the server IHS 300 may be the IHS 100, described above with reference to FIG. 1, and may includes some or all of the components of the IHS 100 such as, for example, the processor 102. In an embodiment, the server IHS 300 may be a variety of servers known in the art such as, for example, a 1U server, a 2U server, or a variety of other IHSs known in the art.

Figure 4:
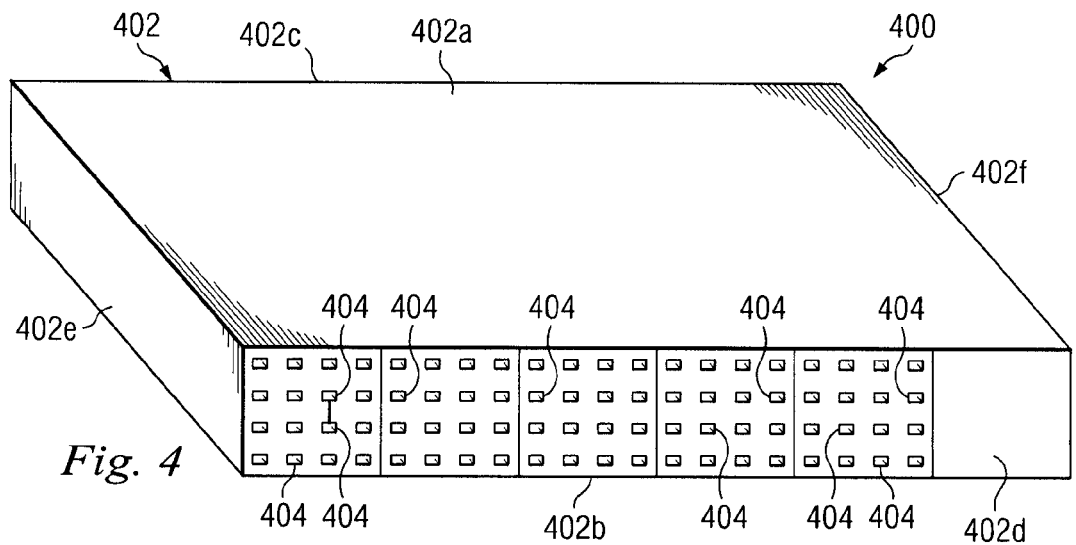
FIG. 4 is a perspective view illustrating an embodiment of an IHS used with the rack of FIG. 2 and the server IHS of FIG. 3.

Referring now to FIG. 4, an IHS 400 is illustrated. The IHS 400 includes a base 402 having a top surface 402a, a bottom surface 402b located opposite the top surface 402a, a front surface 402c extending between the top surface 402a and the bottom surface 402b, a rear surface 402d located opposite the front surface 402c and extending between the top surface 402a and the bottom surface 402b, and a pair of opposing sides surfaces 402e and 402f extending between the top surface 402a, the bottom surface 402b, the front surface 402c, and the rear surface 402d. A plurality of IHS connections 404 are located on the rear surface 402d in a spaced apart orientation from each other. In an embodiment, the IHS 400 may be the IHS 100, described above with reference to FIG. 1, and may includes some or all of the components of the IHS 100 such as, for example, the processor 102. In an embodiment, the IHS 400 may be a networking IHS and the connections 404 may be network connections known in the art.

Figure 5:
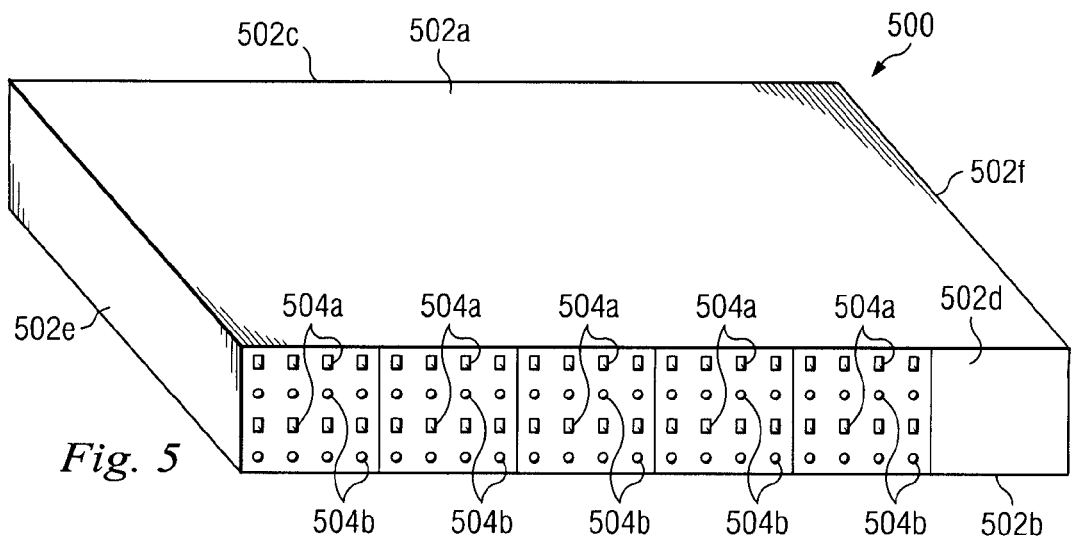
FIG. 5 is a perspective view illustrating an embodiment of an IHS used with the rack of FIG. 2, the server IHS of FIG. 3, and the IHS of FIG. 4.

Referring now to FIG. 5, an IHS 500 is illustrated. The IHS 500 includes a base 502 having a top surface 502a, a bottom surface 502b located opposite the top surface 502a, a front surface 502c extending between the top surface 502a and the bottom surface 502b, a rear surface 502d located opposite the front surface 502c and extending between the top surface 502a and the bottom surface 502b, and a pair of opposing sides surfaces 502e and 502f extending between the top surface 502a, the bottom surface 502b, the front surface 502c, and the rear surface 502d. A plurality of first IHS connections 504a are located on the rear surface 502d in a spaced apart orientation from each other. A plurality of second IHS connections 504b are located on the rear surface 502d in a spaced apart orientation from each other and the first IHS connections 504a. In an embodiment, the IHS 500 may be the IHS 100, described above with reference to FIG. 1, and may includes some or all of the components of the IHS 100 such as, for example, the processor 102. In an embodiment, the IHS 500 may be a networking IHS and the connections 504a and 504b may be, for example, USB connections, VGA connections, and/or a variety of other connections known in the art.

Referring now to FIGS. 6a and 6b, a cable management system 600 is illustrated. The cable management system 600 includes a cable base 602 having a first end 602a, a second end 602b, and a resilient member 602c that, in the illustrated embodiment, includes a coil section of the cable base 602 located between the first end 602a and the second end 602b. In the illustrated embodiment, the coil section resilient member 602c provides in a rest distance A between the first end 602a and the second end 602b of the cable base 602 when there are no outside forces acting on the cable base 602. A plurality of power cables 604a and 604b extend through the cable base 602. A first section of each of the power cables 604a and 604b includes a power connector 604aa and 604ba, respectively, and extends from the first end 602a of the cable base 602. A second section of each of the power cables 604a and 604b includes a power connector 604ab and 604bb, respectively, and extends from the second end 602b of the cable base 602. A plurality of IHS cables 606a, 606b, 606c and 606d extend through the cable base 602. A first section of each of the IHS cables 606a, 606b, 606c and 606d includes an IHS connector 606aa, 606ba, 606ca and 606daa, respectively, and extends from the first end 602a of the cable base 602. A second section of each of the IHS cables 606a, 606b, 606c and 606d includes an IHS connector 606ab, 606bb, 606cb and 606db, respectively, and extends from the second end 602b of the cable base 602. In the illustrated embodiment, the cable management system 600 is fabricated such that a cross section of the cable base 602 includes the power cables 604a and 604b, the IHS cables 606a, 606b, 606c and 606d, and a filler material 608 such that the power cables 604a and 604b and the IHS cables 606a, 606b, 606c and 606d are an integral part of the cable base 602 and not meant to be removed from the cable base 602. While the plurality of cables housed in the cable base 602 have been described as power cables and IHS cables, a variety of different types of cables known in the cabling arts are envisioned to fall within the scope of the present disclosure. Furthermore, the number of cables housed in the cable base 602 may be increased or decreased from that shown in the illustrated embodiment.

Figure 7A:
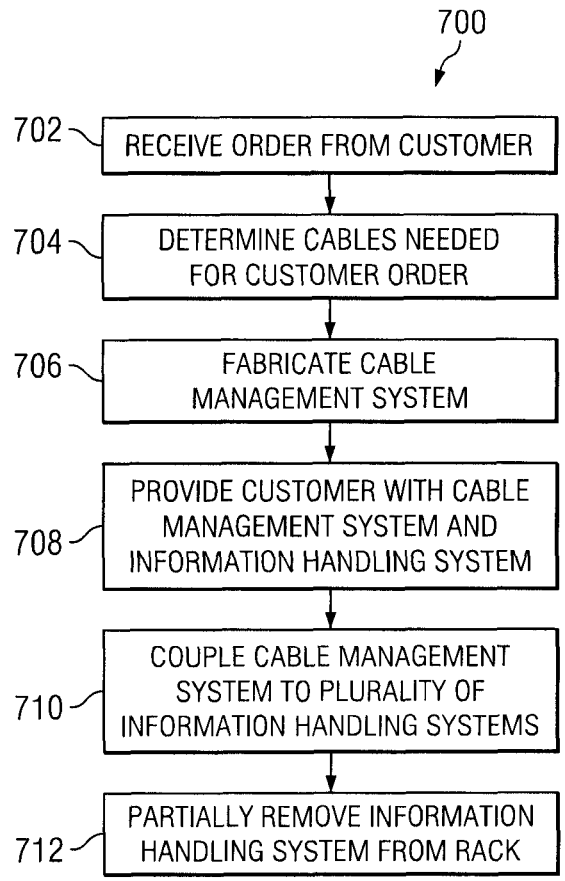
FIG. 7a is a flow chart illustrating an embodiment of a method for providing cable management.

Referring now to FIG. 7a, a method for providing cable management 700 is illustrated. The method 700 begins at step 702 where an order is received from a customer. A provider which may be, for example, an IHS provider, receives an order from a customer for an IHS. The customer order for the IHS includes an IHS functionality that corresponds to a plurality of cables that must be provided and connected to the IHS in order to provide the IHS functionality. The method 700 then proceeds to step 704 where the provider determines the plurality of cables needed for the customer order such that the IHS functionality is provided. In an embodiment, the IHS ordered by the customer may be a standard-type IHS that requires a standard number and type of cables that is the same for all similar standard-type IHSs. In an embodiment, the IHS ordered by the customer may be a custom-type IHS that requires a number and type of cables that is unique to that IHS. The method 700 then proceeds to step 706 where a cable management system such as, for example, the cable management system 600 illustrated in FIGS. 6a and 6b, is fabricated. In an embodiment, the cable management system 600 may include a standard number and types of cables that correspond to a standard-type IHS and may have been fabricated before the order by the customer in step 702. In an embodiment, the cable management system 600 may include a custom number and type of cables that correspond to a custom-type IHS and may be fabricated subsequent to the order by the customer in step 702. The method 700 then proceeds to step 708 where customer is provided with the IHS that was ordered in step 702 and the cable management system the provides the IHS functionality. In an embodiment, the provider ships the IHS and the cable management system 600 to the customer using methods known in the art.

Figure 7B:
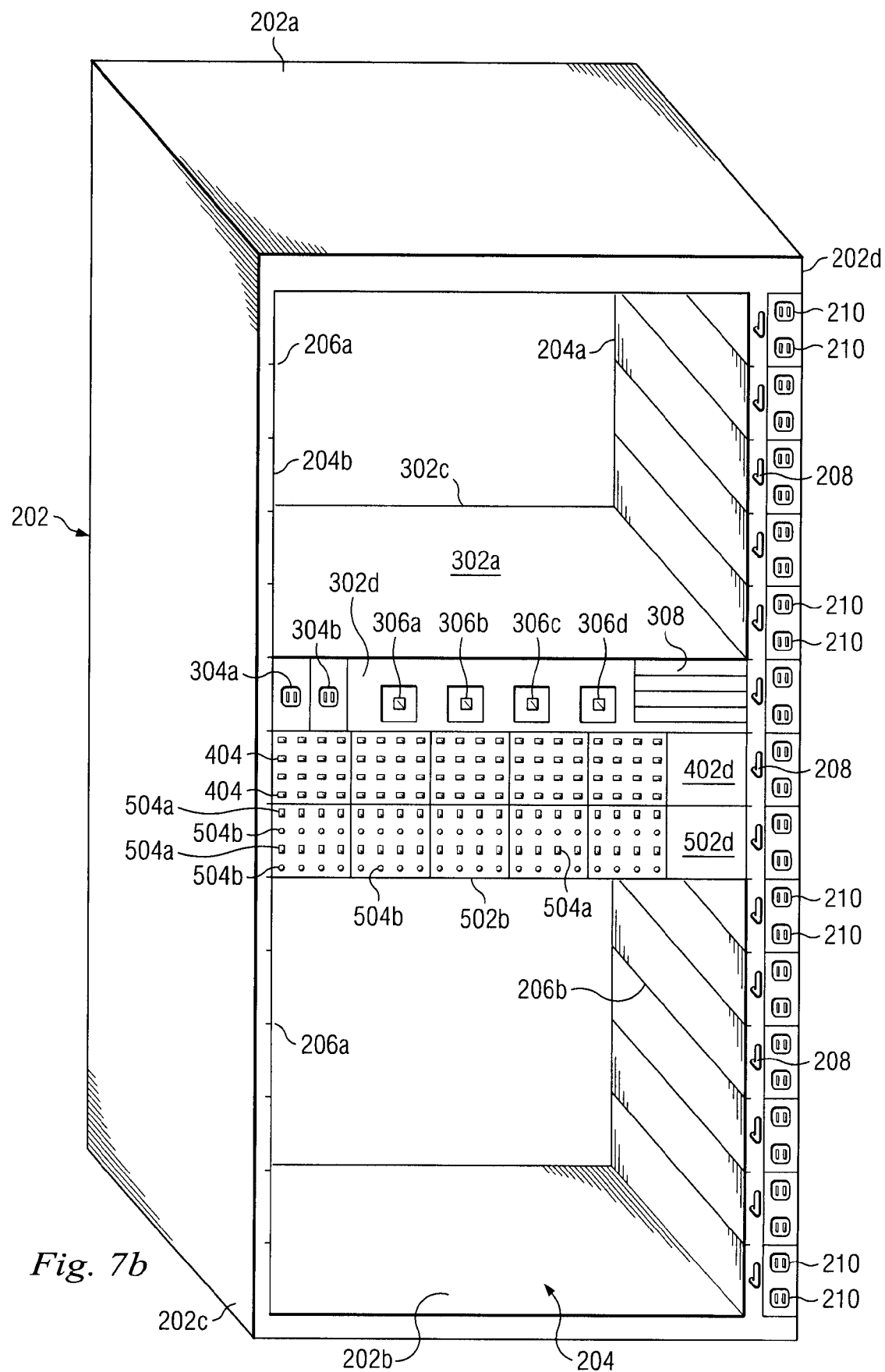
FIG. 7b is a perspective view illustrating an embodiment of the server IHS of FIG. 3, the IHS of FIG. 4, and the IHS of FIG. 5 located in the rack of FIG. 2.

Referring now to FIGS. 2, 3, 4, 5, 6a, 7a, 7b, 7c and 7d, the method 700 then proceeds to step 710 where the cable management system is coupled to a plurality of IHS. The IHS 400 is positioned in the rack 200 by engaging the bottom surface 402b of the IHS 400 with two corresponding guide members 206a and 206b on the rack 200 such that the IHS 200 may be slid from the front housing opening 204a and into the housing 204 defined by the rack 200 such that the rear surface 402d of the IHS 400 is located adjacent the rear housing opening 204b on the rack 200, as illustrated in FIG. 7b. The IHS 500 is positioned in the rack 200 by engaging the bottom surface 502b of the IHS 500 with two corresponding guide members 206a and 206b on the rack 200 and the IHS 500 is slid from the front housing opening 204a and into the housing 204 defined by the rack 200 such that the rear surface 502d of the IHS 500 is located adjacent the rear housing opening 204b on the rack 200 and the IHS 500 is positioned adjacent to the IHS 400, as illustrated in FIG. 7b. In the illustrated embodiment, the IHSs 400 and 500 are positioned substantially centrally in the rack 200. However, the IHSs 400 and 500 may be repositioned in the rack 200 without departing from the scope of the present disclosure. The server IHS 300 is positioned in the rack 200 by engaging the bottom surface 302b of the server IHS 300 with two corresponding guide members 206a and 206b on the rack 200 and the server IHS 300 is slid from the front housing opening 204a and into the housing 204 defined by the rack 200 such that the rear surface 302d of the server IHS 300 is located adjacent the rear housing opening 204b on the rack 200 and the server IHS 300 is positioned adjacent to the IHS 400 and opposite the IHS 400 from the IHS 500, as illustrated in FIG. 7b.

Figure 7C:
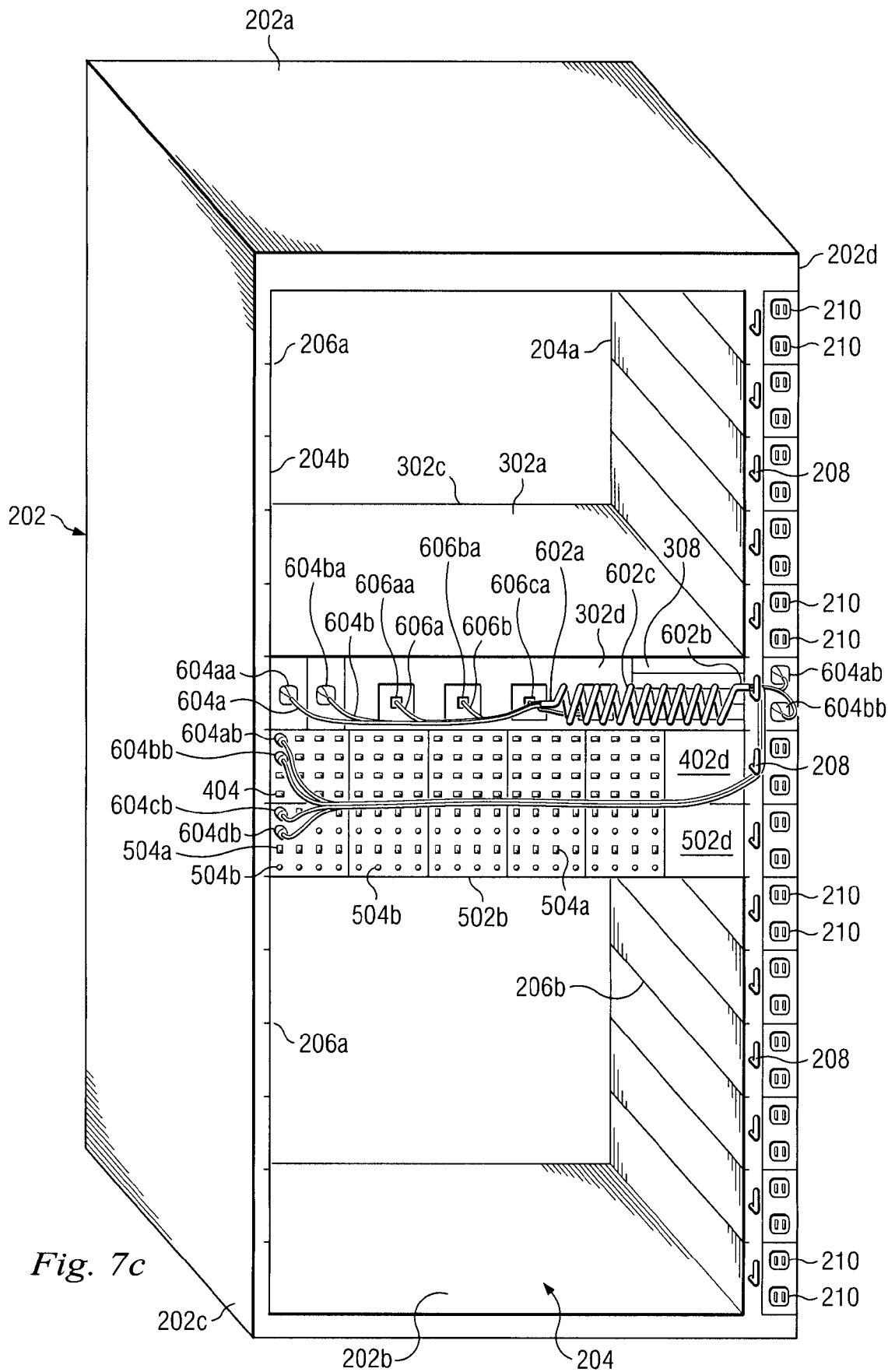
FIG. 7c is a perspective view illustrating an embodiment of the cable management system of FIG. 6a coupled to the server IHS of FIG. 3, the IHS of FIG. 4, the IHS of FIG. 5, and the rack of FIG. 2.
Figure 7D:
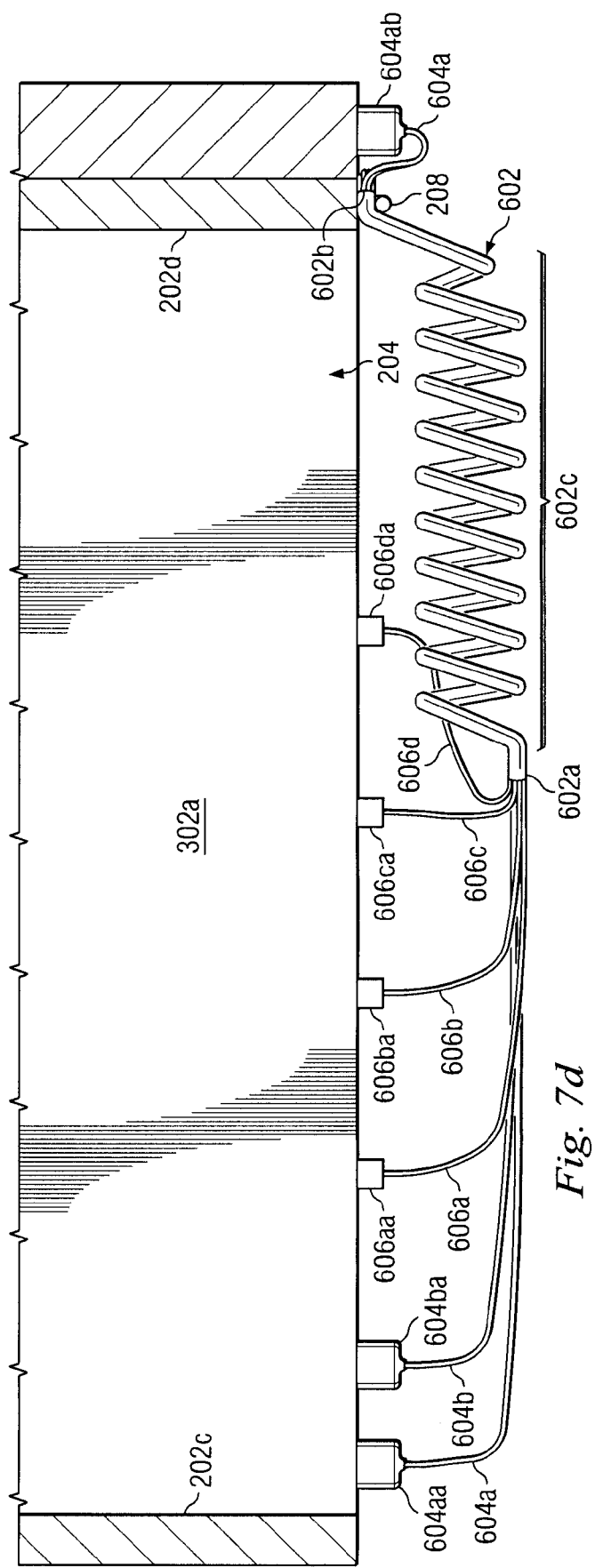
FIG. 7d is a top view illustrating an embodiment of the cable management system of FIG. 6a coupled to the server IHS of FIG. 3 and the rack of FIG. 2.

The cable management system 600 is then coupled to the server IHS 300 by coupling the power connector 604aa on the first section of the power cable 604a to the first power connection 304a on the server IHS 300, coupling the power connector 604ba on the first section of the power cable 604b to the second power connection 304b on the server IHS 300, coupling the IHS connector 606aa on the first section of the IHS cable 606a to the IHS connection 306a on the server IHS 300, coupling the IHS connector 606ba on the first section of the IHS cable 606b to the IHS connection 306b on the server IHS 300, coupling the IHS connector 606ca on the first section of the IHS cable 606c to the IHS connection 306c on the server IHS 300, and coupling the IHS connector 606da on the first section of the IHS cable 606d to the IHS connection 306d on the server IHS 300, as illustrated in FIGS. 7c and 7d. The second end 602b of the cable base 602 is coupled to the anchor member 208 on the rack 200, as illustrated in FIGS. 7c and 7d. In an embodiment, the server IHS 300 includes an anchor member (not shown) located on the rear surface 302d that is similar to the anchor member 208 such that the first end 602a of the cable base 602 may be coupled to the anchor member on rear surface 302d of the server IHS 300.

The cable management system 600 is then coupled to the IHSs 400 and 500 by, for example, coupling each of the power connectors 604ab and 604bb on the second section of the power cables 604a and 604b, respectively, to one of the power connections 210 on the rack 200, coupling the IHS connector 606ab on the second section of the IHS cable 606a to one of the IHS connections 404 on the IHS 400, coupling the IHS connector 606bb on the second section of the IHS cable 606b to one of the IHS connections 404 on the IHS 400, coupling the IHS connector 606cb on the second section of the IHS cable 606c to one of the IHS connections 504a on the IHS 500, and coupling the IHS connector 606db on the second section of the IHS cable 606d to one of the IHS connections 504b on the IHS 500, as illustrated in FIG. 7c. In an embodiment, the fabrication of the cable management system 600 in step 706 of the method 700 may include adjusting the length of the first section and/or the second section of the cables 604a, 604b, 606a, 606b, 606c and 606d such that the length of the first section and/or second section is optimized based on where the server IHS 300 is positioned in the rack 200 and which connections on the IHSs 400a and 500 the connectors 604ab, 604bb, 604cb and 604db must reach in order to allow routing of the cables 604a, 604b, 606a, 606b, 606c and 606d through the rack 200 without obstructing access to features on the IHSs 300, 400 and 500 and/or the rack 200.

Figure 7E:
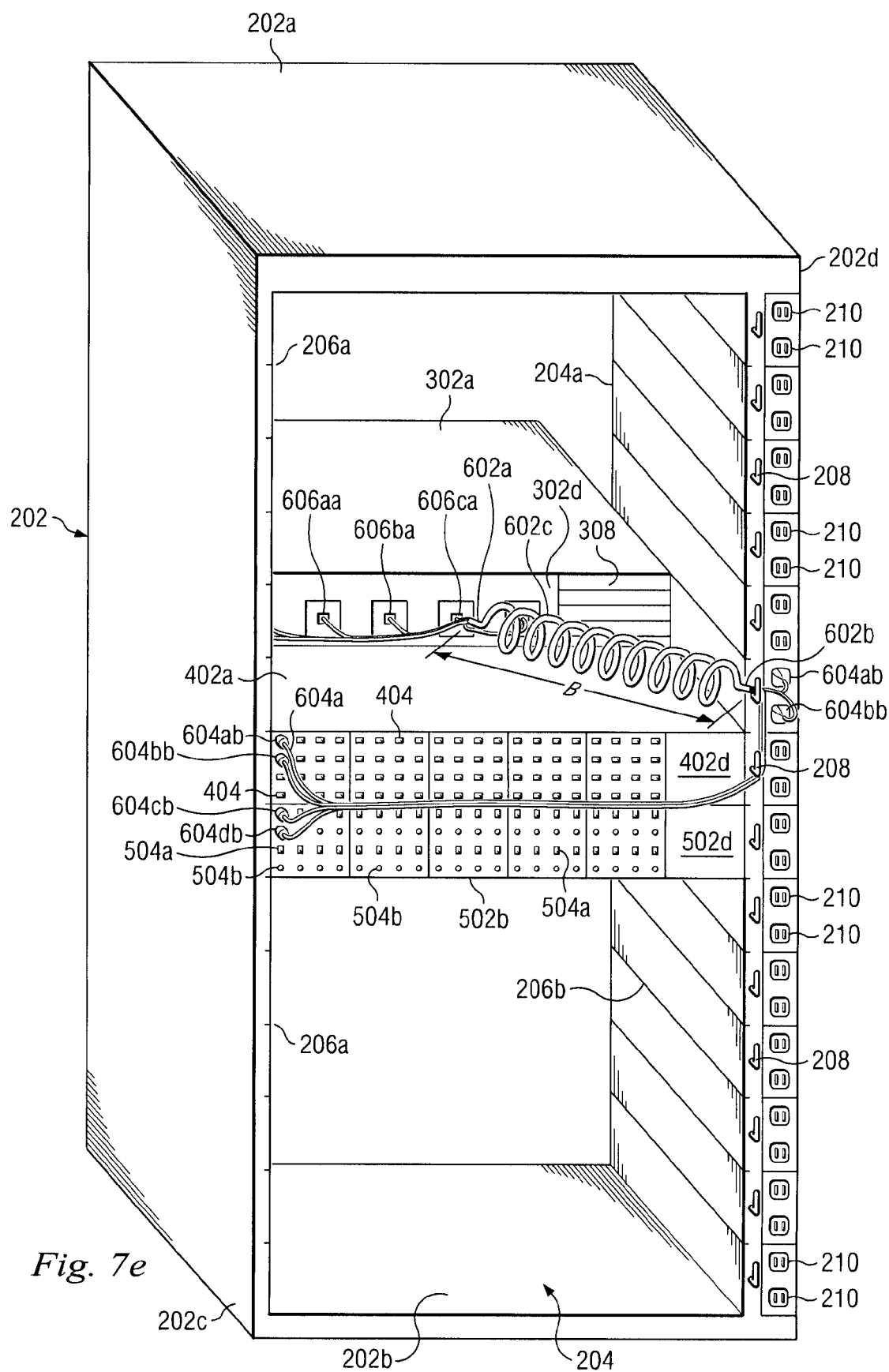

Referring now to FIGS. 2, 3, 4, 5, 6a, 7a and 7e, the method 700 then proceeds to step 712 where the server IHS 300 is partially removed from the rack 200. The server IHS 300 may be slid on the engagement of the bottom surface 302b and the guide members 206a and 206b such that a portion of the server IHS 300 exits the housing 204 through the front housing opening 204a, as illustrated in FIG. 7e. As the server IHS 300 is partially removed from the rack 200, the resilient member 602c on the cable base 602 allows the distance between the first end 602a of the cable base 602 and the second end 602b of the cable base 602 to change to an activated distance B, illustrated in FIG. 7e. In the illustrated embodiment, the activated distance B is greater than the rest distance A, described above with reference to FIG. 6a. In an embodiment, by partially removing the server IHS 600 from the rack 200 as illustrated, the server IHS 300 may be serviced without decoupling any of the cables 604a, 604b, 606a, 606b, 606c and/or 606d from the server IHS 600, which allows, for example, hot swapping (e.g. the addition and/or removal of IHS components to and/or from the IHS 600 without disrupting the IHS 300 by, for example, powering off the IHS 300, unplugging the IHS 300 from its power source, and/or a variety of other actions that known in the art that disrupt the IHS 300) of components housed in the server IHS 300. When the server IHS 300 is then moved back into the housing 204 defined by the rack 200, the resilient member 602c decreases the distance between the first end 602a and the second end 602b of the cable base 602 back to a distance that is substantially equal to the rest distance A, illustrated in FIG. 7c, which prevents the cable base 602 from interfering with access to other IHSs in the rack 200. The cable management system 600 provides a simplified cabling of the IHS 300 relative to conventional systems. Furthermore, troubleshooting a problem with the IHS 300 is simplified as the plurality of cables used for the IHS 300 are grouped together in the rack 200.

Figure 7F:
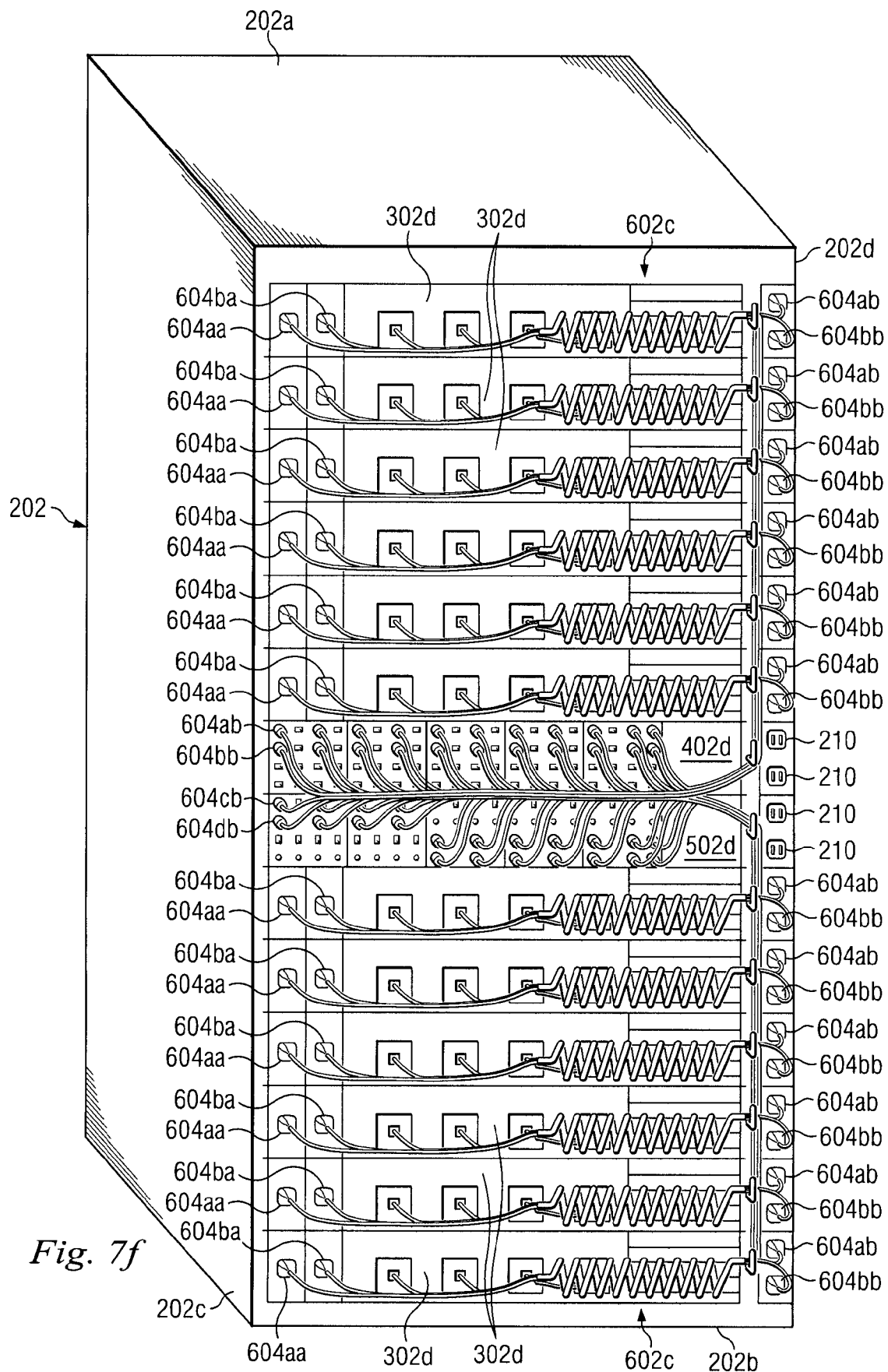

Referring now to FIGS. 2, 3, 4, 5, 6a, 7a and 7f, a plurality of the IHSs 300 may be positioned in the rack 200 in substantially the same manner as illustrated and described above with reference to FIG. 7b, and a cable management system 600 which operates in the substantially the same manner as illustrated and described above with reference to FIGS. 7c, 7d and 7e, may be provided for each IHS 300, illustrated in FIG. 7f. Thus, a cable management system is provided that allows simplified cabling and troubleshooting of an IHS while allowing the IHS to be moved in a rack without decoupling the cables from the IHS. Furthermore, IHSs cabling with the cable management systems 600 becomes more consistent across customers, further simplifying problem diagnosis of the IHSs.

Figure 7G:
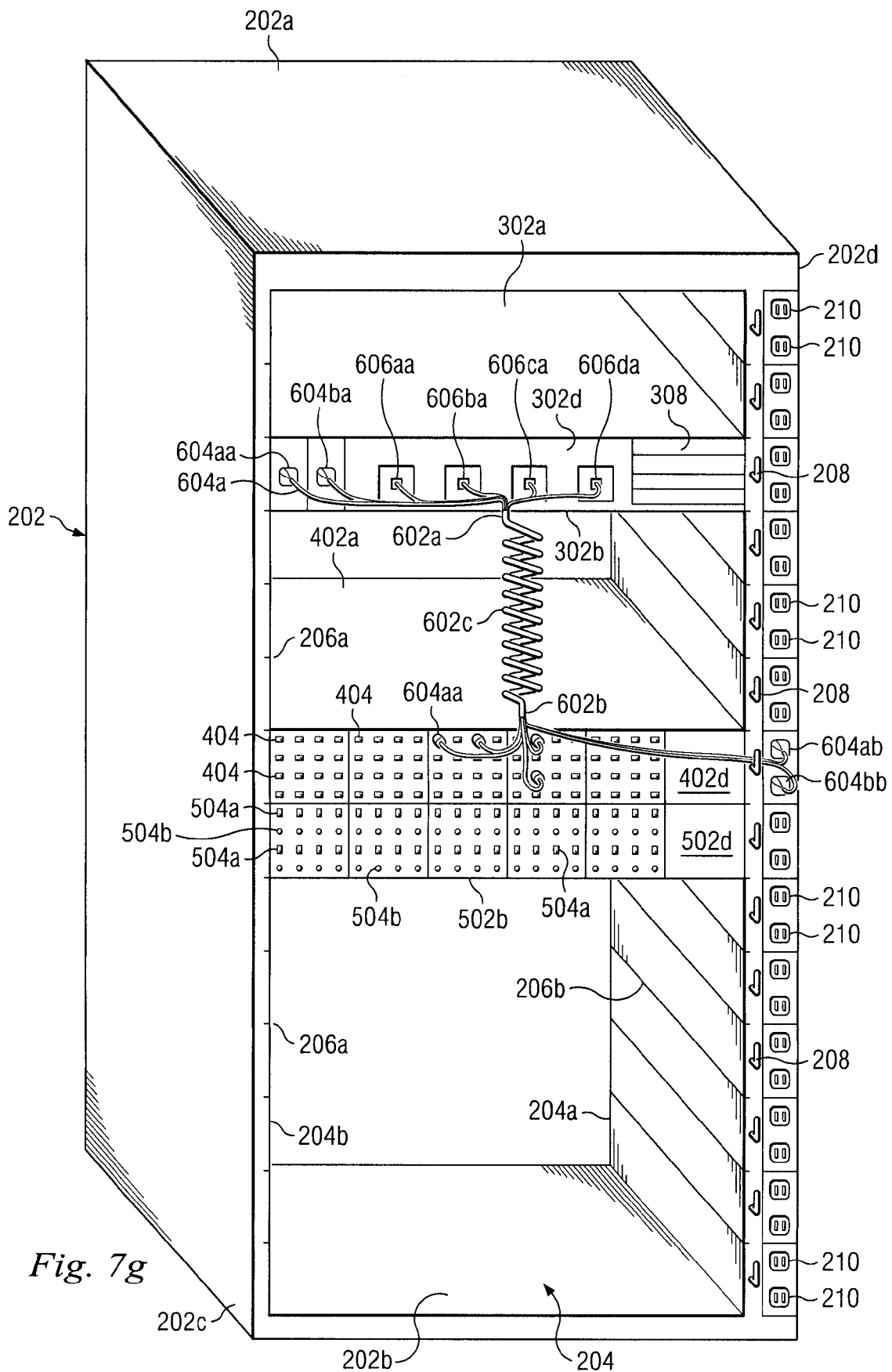
FIG. 7g is a perspective view illustrating an alternative embodiment of the cable management system of FIG. 6a coupled to the server IHS of FIG. 3, the IHS of FIG. 4, the IHS of FIG. 5, and the rack of FIG. 2.
Figure 7H:
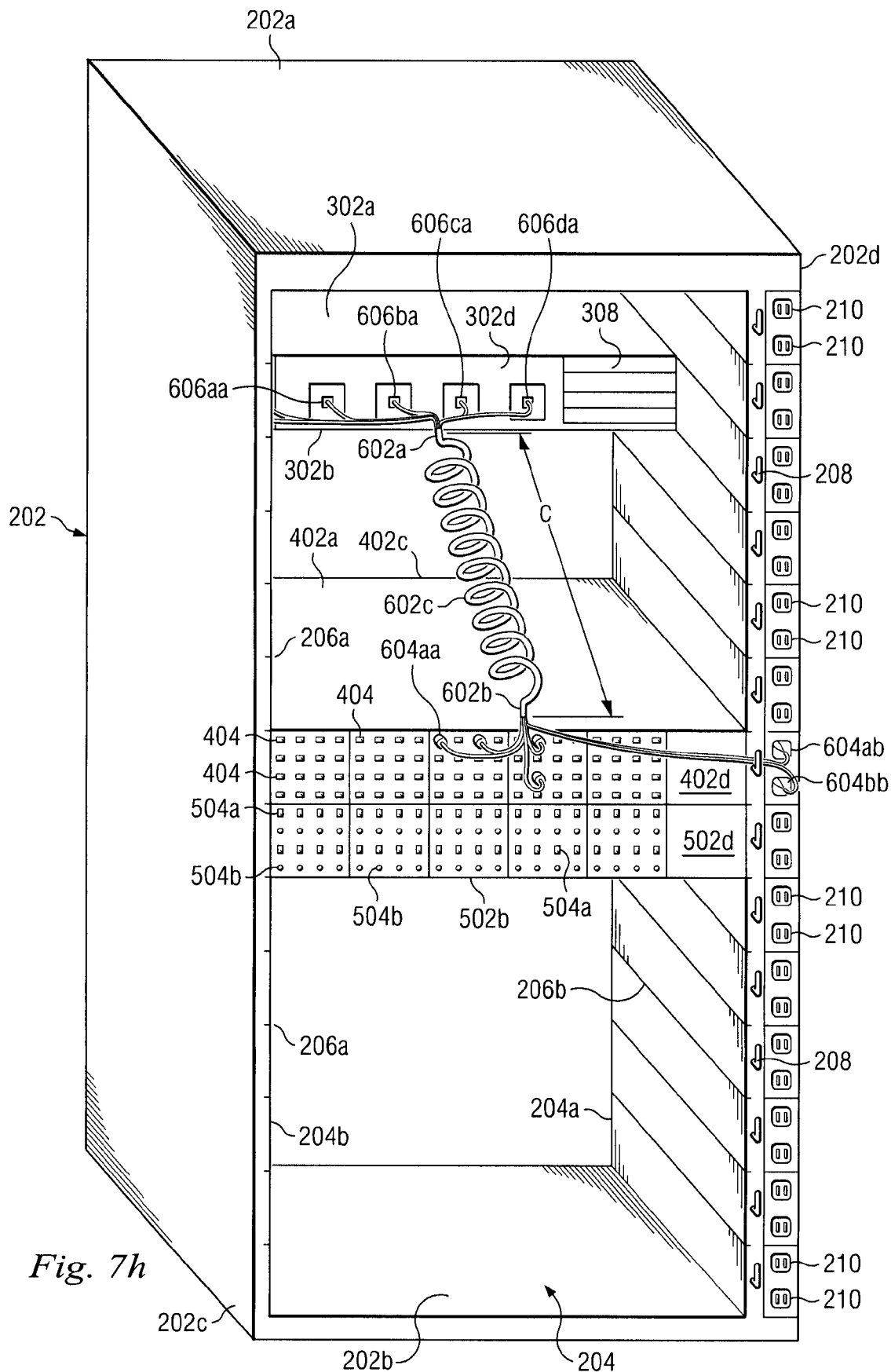

Referring now to FIGS. 2, 3, 4, 5, 6a, 7a, 7g and 7h, in an embodiment, during the step 710 of the method 700, the cable management system 600 may not be coupled to one of the anchor members 208 on the rack 200, but rather the cable base 602 may extend between the server IHS 300 and the IHS 400 and 500 in a substantially perpendicular orientation relative to the server IHS 300 and the IHSs 400 and 500, as illustrated in FIG. 7g. At step 712 of the method 700, when the server IHS 300 is partially removed from the rack 200, the resilient member 602c on the cable base 602 allows the distance between the first end 602a of the cable base 602 and the second end 602b of the cable base 602 to change to an activated distance C, illustrated in FIG. 7h. In the illustrated embodiment, the activated distance C is greater than the rest distance A, described above with reference to FIG. 6a. In an embodiment, as additional server IHSs 300 are added to the rack, the cables bases 602 of additional cable management systems 600 may be fabricated such that they are offset relative to each other in order to minimize interference between cable management systems 600.

Referring now to FIGS. 6a, 6b, 7a and 8, in an embodiment, a cable management system 800 is substantially similar in design and operation to the cable management system 600, described above with reference to FIGS. 6a, 6b, 7a, 7b, 7c, 7d, 7e, 7f and 7g, with the provision of a modified cable base 802. The modified cable base 802 includes a first end 802a and a second end 802b located opposite the first end 802a, but does not include a resilient member, rather, the cable base 902 acts similar to a conventional cable that may be pulled into a linear orientation by applying a force to the first end 802a and the second end 802b while having 'slack' when the first end 802a is brought adjacent the second end 802b, illustrated in FIG. 8. The cross section of the cable base 802 is substantially similar to the cross section of the cable base 602 illustrated in FIG. 6b, as the cable base 802 and the cables 604a, 604b, 606a, 606b, 606c and 606d are fabricated as an integral part of the cable base 602 during step 706 of the method 700. The length of the cable base 802 between the first end 802a and the second end 802b is fabricated in step 706 of the method 700 such that the cables 604a, 604b, 606a, 606b, 606c and 606d are operable to electrically couple the IHS 300 to the IHSs 400 and 500, as described above in step 710 of the method, and to allow the IHS 300 to be partially removed from the rack 200, as described above in step 712 of the method 700.

Referring now to FIGS. 6a, 6b, 7a and 9, in an embodiment, a cable management system 900 is substantially similar in design and operation to the cable management system 600, described above with reference to FIGS. 6a, 6b, 7a, 7b, 7c, 7d, 7e, 7f and 7g, with the provision of a modified cable base 902. The modified cable base 902 includes a first end 902a and a second end 902b located opposite the first end 902a. A resilient member 904 is located on the cable management system 900 and includes a resilient spool 904a that holds the cable base 902 such a rest distance D is provided between the first end 902a and the second end 902b, as illustrated in FIG. 9. The resilient spool 904a allows the cable base 902 to extend from the resilient member 904 to change the distance between the first end 902a and the second end 902b from the rest distance D to an activated distance that is similar to the activated distance B when a force is applied to the first end 902a, described above with reference to FIG. 7e, while resiliently pulling the first end 902a back towards the resilient member 904 and spooling the cable base 902 when the force is removed from the first end 902a. The cable management system 900 may be coupled to the IHSs 300, 400 and 500 in substantially the same manner as described above for the cable management system 600 in step 710 of the method 700, and the resilient member 904 may be coupled to, for example, the anchor member 208. The IHS 300 may then be partially removed from the rack 200 while the cable base 902 is allowed to change the distance between the first end 902a and the second end 902b using the resilient member 904.

Figure 10A:
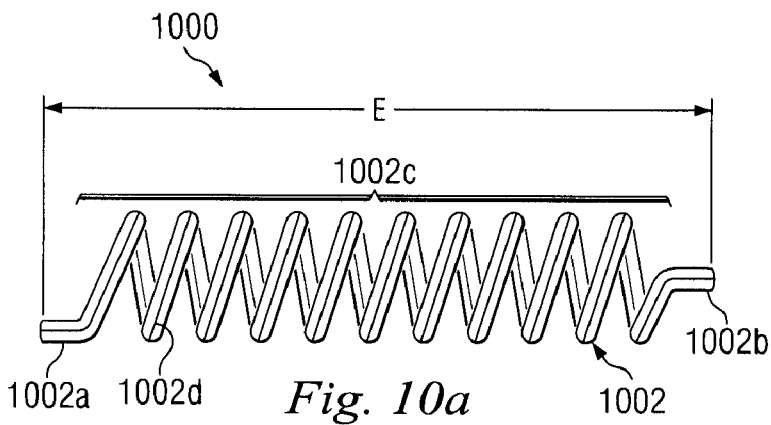
FIG. 10a is a side view illustrating an alternative embodiment of a cable management system.
Figure 10B:
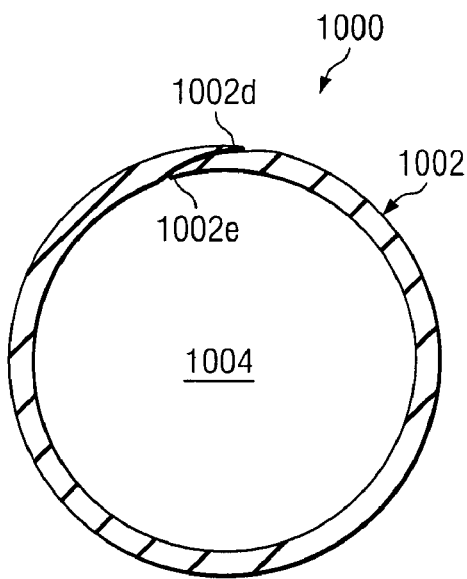
Figure 10C:
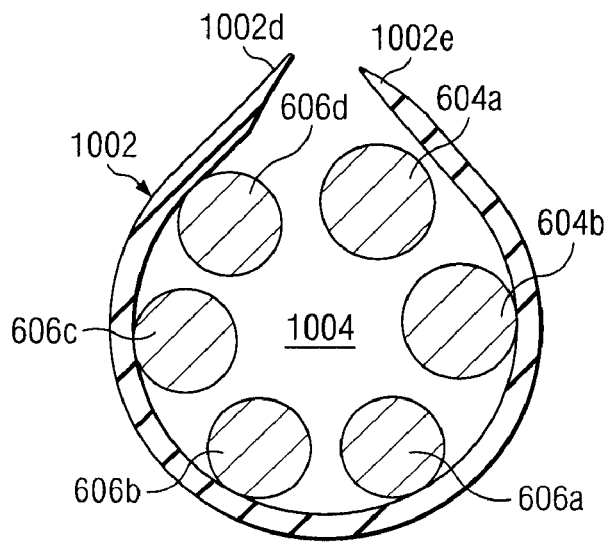
FIG. 10c is a cross sectional view illustrating an embodiment of the cable management system of FIG. 10a housing a plurality of cables.
Figure 10D:
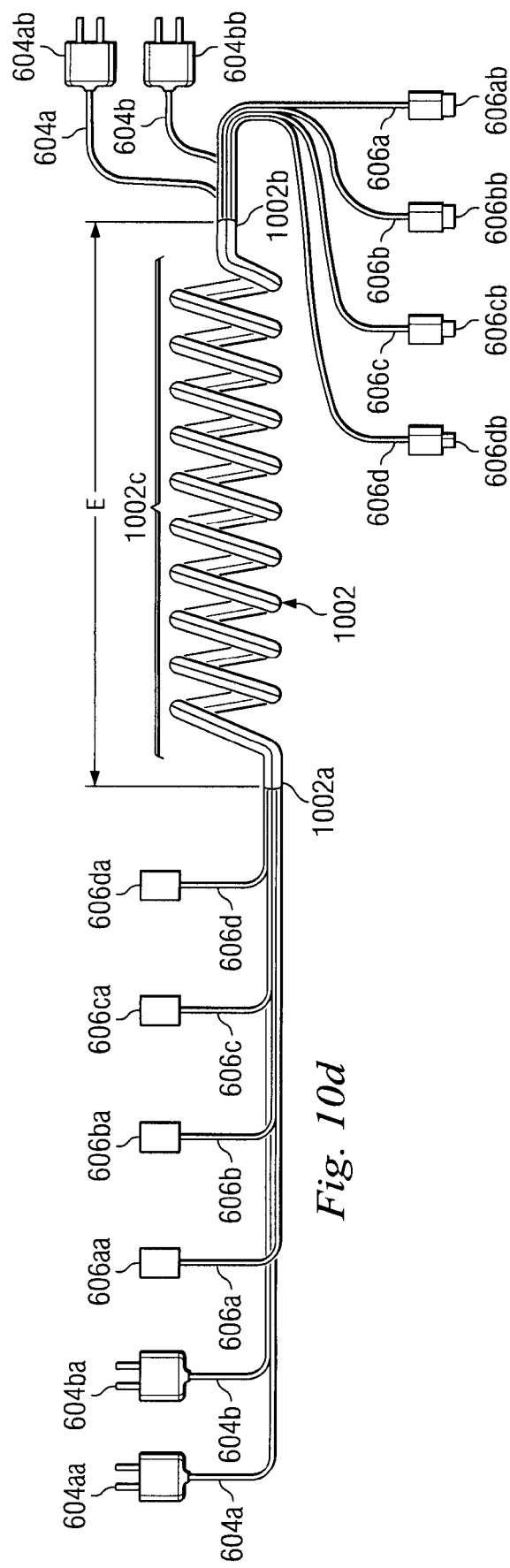
FIG. 10d is a side view illustrating an embodiment of the cable management system of FIG. 10a housing a plurality of cables.

Referring now to FIGS. 6a, 6b, 7a, 10a, 10b, 10c, and 10d, in an embodiment, a cable management system 1000 is substantially similar in design and operation to the cable management system 600, described above with reference to FIGS. 6a, 6b, 7a, 7b, 7c, 7d, 7e, 7f and 7g, with the provision of a modified cable base 1002. The modified cable base 1002 includes a first end 1002a, a second end 1002b located opposite the first end 1002a, and a resilient member 1002c that, in the illustrated embodiment, includes a coil section of the cable base 1002 located between the first end 1002a and the second end 1002b. In the illustrated embodiment, the coil section resilient member 1002c provides in a rest distance E between the first end 1002a and the second end 1002b of the cable base 1002 when there are no outside forces acting on the cable base 1002. The cable base 1002 also includes a pair of edges 1002d and 1002e that are located along the length of the cable base 1002 and adjacent to each other as the cable base 1002 is tubular, illustrated in FIG. 10b. A cable passageway 1004 is defined by the cable base 1002 and along the length of the cable base 1002. A plurality of cables such as, for example, the plurality of cables 604a, 604b, 606a, 606b, 606c and 606d, may be positioned in the cable base 1002 by pulling the edges 1002d and 1002e of the cable base 1002 away from each other to allow the cables 604a, 604b, 606a, 606b, 606c and 606d to enter the cable passageway 1004, as illustrated in FIG. 10c. The cable management system 1000 including the cables 604a, 604b, 606a, 606b, 606c and 606d, may be coupled to the IHSs 300, 400 and 500 in substantially the same manner as described above for the cable management system 600 in step 710 of the method 700. The IHS 300 may then be partially removed from the rack 200 as described above in step 712 of the method 700.

Figure 11:
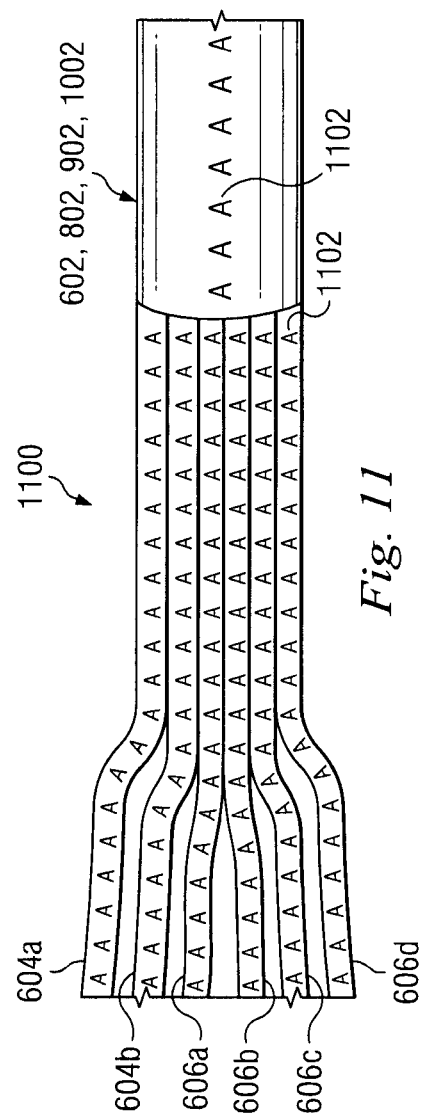
FIG. 11 is a side view illustrating an alternative embodiment of a cable management system including indicators.

Referring now to FIG. 11, in an embodiment, a cable management system 1100 is substantially similar in design and operation to the cable management systems 600, 800, 900 and 1000, described above with reference to FIGS. 6a, 8, 9 and 10, with the provision of indicators 1102 located on the cable base 602, 802, 902 and/or 1002 and/or on the cables 604a, 604b, 606a, 606b, 606c and 606d. In an embodiment, the indicators 1102 may be alphanumeric characters such as, for example, the "A" of the illustrated embodiment, colors, patterns, or a variety of other indicators known in the art. In an embodiment, the indicators 1102 may include additional identifiers for each of the cables 604a, 604b, 606a, 606b, 606c, and 606d such as, for example, "A1", "A2", "A3", "A4", "A5" and "A6". In an embodiment, if a provider provides a customer with a plurality of IHSs and respective cable management systems in step 708 of the method 700, the identifiers 1102 provided for each cable management system may be different in order to simplify the tracking of the cables in a particular cable management system that are coupled to a particular server IHS.

While the cable management systems disclosed above have been described and illustrated with reference to the connecting of IHSs in a rack, the disclosure should not be so limited. A wide range of applications that require a plurality of cables to provide functionality are envisioned to fall within the scope of this disclosure, such as, but not limited to, home entertainment systems, automobile audio systems, and/or a variety of other cable-requiring systems known in the art.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information handling system, comprising:
   a rack;
   a first information handling system located in the rack;
   a processor housed in the first information handling system;
   a second information handling system located in the rack; and
   a first cable management system electrically coupling the first information handling system to the second information handling system, the first cable management system comprising:
      a cable base comprising a first end, a second end, and a helical spring shaped resilient member that is operable to allow a rest distance between the first end and the second end to be changed; and
      a plurality of cables partially housed in the cable base;
      wherein each cable comprises a first section that extends from the first end of the cable base and that is electrically coupled to the first information handling system; and
      wherein each cable also comprises a second section that extends from the second end of the cable base and that is electrically coupled to the second information handling system.

2. The information handling system of claim 1, wherein each cable comprises a first cable connector located on the first section and a second cable connector located on the second section, whereby at least one of the first cable connectors is electrically coupled to a first power connector and at least one of the second cable connectors is electrically coupled to a second power connector.

3. The information handling system of claim 1, wherein the helical spring shaped resilient member is operable to allow the rest distance between the first end and the second end to be changed in response to the second information handling system being partially removed from the rack.

4. The information handling system of claim 1, wherein the portion of the plurality of cables that are housed in the cable base are an integral part of the cable base.

5. The information handling system of claim 1, wherein the cable base defines a cable passageway, whereby the plurality of cables are located in the cable passageway and the cable base is operable to allow the plurality of cables to be removed from the cable passageway.

6. The information handling system of claim 1, wherein the cable base and the plurality of cables each comprise an indicator that is operable to indicate that the cable base and the plurality of cables are part of the first cable management system.

7. The information handling system of claim 1, wherein the rack comprises a cable management system anchor, whereby the first cable management system is coupled to the cable management system anchor.

8. The information handling system of claim 1, wherein the resilient member is operable to allow the rest distance between the first end and the second end to be changed such that the first information handling system may be moved partially out of the rack without decoupling the at least one first cable connector from the first information handling system.

9. The information handling system of claim 1, further comprising:
    a third information handling systems located in the rack;
    a second cable management system electrically coupling the third information handling system to the second information handling system, the second cable management system comprising:
        a cable base comprising a first end, a second end, and a helical spring shaped resilient member that is operable to allow a rest distance between the first end and the second end to be increased; and
        a plurality of cables partially housed in the cable base;
        wherein each cable comprises a first section that extends from the first end of the cable base and that is electrically coupled to the third information handling system; and
        wherein each cable also comprises a second section that extends from the second end of the cable base and that is electrically coupled to the second information handling system.

10. The information handling system of claim 9, wherein the first cable management system comprises a plurality of first cable management system indicators and the second cable management system comprises a plurality of second cable management system indicators that are different from the plurality of first cable management system indicators.

11. A method for providing cable management, comprising:
    receiving an order for an information handling system from a customer, wherein the order comprises an information handling system functionality;
    determining a plurality of cables that are required to provide the information handling system functionality; and
    providing the customer with the information handling system and a cable management system, wherein the cable management system comprises:
        a cable base comprising a first end, a second end, and a helical spring shaped resilient member that is operable to allow a rest distance between the first end and the second end to be increased; and
        the plurality of cables that are required to provide the customer requested functionality, wherein the plurality of cables are partially housed in the cable base and integral to the cable base, wherein each cable comprises a first section that extends from the first end of the cable base and a second section that extends from the second end of the cable base.

12. The method of claim 11, wherein the helical spring shaped resilient member is operable to allow the rest distance between the first end and the second end to be changed in response to the information handling system being partially removed from a rack.

13. The method of claim 11, further comprising:
    fabricating the cable management system.

* * * * *